US006485827B2

(12) United States Patent
Griffith, Jr. et al.

(10) Patent No.: US 6,485,827 B2
(45) Date of Patent: Nov. 26, 2002

(54) PRESSURE SENSITIVE ADHESIVE TAPE CONTAINING NATURAL RUBBER LATEX

(75) Inventors: William Bryan Griffith, Jr., North Wales, PA (US); Andrew Graham Bunn, Bryn Mawr, PA (US); Isabelle Ercolei Uhl, Grasse (FR); Kim Sang Ho, Richboro, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/981,225

(22) Filed: Oct. 17, 2001

(65) Prior Publication Data

US 2002/0132966 A1 Sep. 19, 2002

Related U.S. Application Data

(63) Continuation-in-part of application No. 09/780,341, filed on Feb. 12, 2001.
(60) Provisional application No. 60/261,728, filed on Jan. 16, 2001.

(51) Int. Cl.$^7$ ................................................. B32B 7/12
(52) U.S. Cl. ...................... 428/356; 428/343; 428/353; 428/354; 428/355 R
(58) Field of Search ................. 428/343, 353, 428/354, 355 R, 356

(56) References Cited

U.S. PATENT DOCUMENTS

| 3,380,938 | A | | 4/1968 | Mistley et al. | |
|---|---|---|---|---|---|
| 3,628,987 | A | * | 12/1971 | Nakata et al. | 427/208.4 |
| 4,208,311 | A | * | 6/1980 | Kinoshita et al. | 523/402 |
| 4,644,026 | A | | 2/1987 | Shuman et al. | 524/270 |
| 5,547,766 | A | | 8/1996 | Gobran | 428/515 |
| 5,663,213 | A | | 9/1997 | Jones et al. | 523/105 |
| 5,728,759 | A | | 3/1998 | Pike | 524/270 |
| 5,891,580 | A | * | 4/1999 | Fricke et al. | 156/331.4 |
| 6,017,998 | A | * | 1/2000 | Duan et al. | 428/423.1 |
| 6,218,588 | B1 | | 8/2001 | Dommisse | |
| 6,294,250 | B1 | * | 9/2001 | Date | 427/207.1 |

FOREIGN PATENT DOCUMENTS

| DE | 3842344 A1 | 6/1990 | .......... C09J/107/02 |
|---|---|---|---|
| EP | 0622432 A1 | 11/1994 | ............ C09J/7/04 |
| EP | 0669124 A1 | 8/1995 | ............ A61K/7/42 |
| EP | 0688843 A1 | 12/1995 | ............ C09J/7/02 |
| EP | 0761201 A1 | 3/1997 | ............ A61K/7/42 |
| EP | 0960923 A1 | 12/1999 | .......... C09J/107/02 |
| JP | 11-172212 | 6/1999 | ............ C09J/7/02 |
| WO | WO84/04533 | 11/1984 | ........... C08L/51/04 |
| WO | WO00/15727 | 3/2000 | ............ C09J/7/02 |

OTHER PUBLICATIONS

Butler, G.L., "Natural Rubber Adhesives", Handbook of Pressure Sensitive Adhesive Technology, 2$^{nd}$ ed., pp. 261–295. (1989).
De Hullu, J.G., "Tackified Waterborne Adhesives", AFERA Congress, pp. 1–4. (1997).
Oldack et al., "Compounding Natural Latex in Water–Based PSA's", Adhesives Age, pp. 38–44. (Apr. 1979).
St. Cyr, David R., "Natural Latex", The Ore and Chemical Corporation. (May 1997).

* cited by examiner

Primary Examiner—James J. Seidleck
Assistant Examiner—Travis B. Ribar
(74) Attorney, Agent, or Firm—Kenneth Crimaldi; Carl P. Hemenway

(57) ABSTRACT

An adhesive tape comprising: (a) a polymer film; (b) a primer coat on said polymer film; and (c) an adhesive layer on the primer coat comprising: (i) a natural rubber latex; and (ii) a tackifier.

13 Claims, No Drawings

PRESSURE SENSITIVE ADHESIVE TAPE CONTAINING NATURAL RUBBER LATEX

CROSS REFERENCE TO RELATED PATENT APPLICATIONS

This is a continuation-in-part of co-pending application Ser. No. 09/780,341, filed Feb. 12, 2001, and also claims priority from co-pending provisional application serial No. 60/261,728, filed Jan. 16, 2001.

BACKGROUND

This invention relates generally to an adhesive tape comprising a tackified natural rubber latex and a primer.

The use of natural rubber in pressure sensitive adhesives is well known. Such adhesives employ solvent-borne natural rubber, in which rubber obtained by centrifuging natural rubber latex is masticated and applied to a backing material from a solvent solution. The mastication process decreases the molecular weight of the rubber, which is believed to result in improved adhesion, possibly at the expense of cohesive strength.

There has been no significant commercial production of adhesive coatings made from water-borne rubber to date, despite the fact that environmental and health factors would favor the use of water-borne rubber. Anchorage of the adhesive to the filmic backing is a critical problem in natural rubber latex adhesive tapes. When rolls of the tape are unwound, delamination and adhesive transfer to the back side of the film remaining on the roll frequently occur. A related concern is that the tapes generate considerable noise on commercial lines when they are unwound for slitting into small rolls of adhesive tape.

Adhesive tapes from waterborne natural rubber latex have been known since the 1940's, when methods were developed to incorporate water-insoluble solid tackifiers into aqueous dispersions. The problem of anchorage was addressed by incorporating addition polymer emulsions. Unfortunately, addition polymers are detrimental to the adhesive properties of the tape and thus are not commercially useful.

Japanese patent application, JP 11-172212 (1999), suggests that an adhesive comprising natural rubber latex, synthetic rubber latex, and an ethylene-vinyl acetate-acrylate copolymer emulsion provides good anchorage. All examples without the EVA copolymer have poor anchorage and high unwind noise due to stepped delamination. However, this reference acknowledges that use of the EVA copolymer has a detrimental effect on the adhesive properties, a deficiency which is partially overcome by the use of the synthetic rubber.

The problem addressed by this invention is to find a pressure sensitive tape adhesive containing natural rubber latex and having a good balance of adhesive properties, as well as anchorage. An additional benefit for a pressure sensitive tape would be low noise upon unwinding.

STATEMENT OF INVENTION

The present invention is directed to an adhesive tape comprising: (a) a polymer film; (b) a primer coat on said polymer film; and (c) an adhesive layer on the primer coat, the adhesive layer comprising: (i) a natural rubber latex; and (ii) a tackifier.

DETAILED DESCRIPTION

The term "adhesive tape" includes, for example, packaging tape, printable tape, specialty tape and protective film.

The term "polymer film" refers to any polymer in the form of a film suitable for manufacture of an adhesive tape. The preferred polymer films are those made from polyolefins, including but not limited to polypropylene, polyethylene and copolymers and combinations thereof; polyester; and polyvinyl chloride (PVC). The most preferred polymer film is oriented polypropylene film (OPP). Preferably, the polymer film has undergone corona or flame treatment to improve anchorage prior to being coated with primer and adhesive.

The term "acrylic polymers" refers to polymers of acrylic acid, methacrylic acid and their esters, and copolymers predominantly comprising the aforementioned monomers.

The term "tackifier" refers to a resin or combination of resins which imparts tack to an adhesive formulation, especially in the context of a tape adhesive. Preferred tackifiers include rosin tackifiers, polyterpene resins, aliphatic hydrocarbon resins, aromatic petroleum resins, phenol resins, styrene resins and coumarone-indene resins. A "rosin tackifier" is a tackifier derived from a rosin, including but not limited to rosins, rosin esters, rosin derivatives, hydrogenated rosins, hydrogenated rosin esters and hydrogenated rosin derivatives. The rosin tackifier is included as the solid resin or as a liquid dispersion or emulsion. The preferred rosin tackifier is a rosin ester tackifier.

The term "primer" refers to a solvent-based or aqueous material applied to a polymer film backing to form a primer coat, thereby increasing anchorage of a tape adhesive to the film. In one preferred embodiment, the primer coat comprises a natural rubber and a crosslinked polymeric phase; this primer coat typically is formed by applying to a polymer film a primer comprising: (i) a natural rubber; (ii) at least one additional polymeric component containing functional groups suitable for crosslinking; and (iii) a crosslinking agent. Preferably, at least one of the additional polymeric component(s) in the primer has a $T_g$ no greater than $-10°$ C. In another preferred embodiment, the primer is a solvent-based or aqueous polymer composition in which the principal bulk polymeric phase has a $T_g$ no greater than $-10°$ C. Preferably, the primer comprises an aqueous polymer composition in which at least one polymeric component has a $T_g$ no greater than $-10°$ C., and which contains a crosslinking agent. Most preferably, the primer contains a single polymeric phase. Preferred primers include solvent-based or aqueous acrylic polymers, ethylene-vinyl acetate copolymers, ethylene-vinyl acetate-acrylic copolymers, as well as natural and synthetic rubbers such as polyisoprene, polyisobutylene, styrene-butadiene copolymers, and styrene-butadiene-acrylonitrile copolymers, and copolymers or mixtures of the aforementioned polymers. Optionally, the primer includes other additives such as plasticizers or tackifiers. In a preferred embodiment of the invention, the polymeric component of the primer comprises at least 0.2% of monomer units bearing a functional group suitable for crosslinking, e.g., carboxylic acid, hydroxyl, and amine; more preferably at least 1%. Still more preferably, the polymeric component includes an acrylic polymer having a $T_g$ no greater than $-10°$ C. and comprising from 1% to 5% of acrylic acid or methacrylic acid monomer units, most preferably from 1.5% to 2.5%. In one preferred embodiment of the invention, the primer comprises an acrylic polymer containing at least 0.2% of monomer units having carboxylic acid functionality, a natural rubber latex, a tackifier and an isocyanate crosslinker.

Preferably, at least one crosslinking agent is added to the primer, preferably before coating the primer on the polymer film. A crosslinking agent is a material effective for crosslinking, e.g., via hydroxyl or carboxylic acid functional groups in an aqueous medium or in a solvent. Preferably, one of the crosslinking agents well known in the art is used with a primer which includes a polymeric component bearing the appropriate functional groups. These crosslinking agents include, but are not limited to, difunctional or polyfunctional isocyanates, blocked isocyanates, carbodiimides, diamines, triamines, polyamines, aziridines, amine functional resins, e.g., melamines and urea-formaldehyde resins, epoxy resins, epoxides, acids, anhydrides and polymers with conjugated unsaturation. Preferred crosslinking agents are those which are effective for crosslinking via either hydroxyl or carboxylic acid functional groups, or both, especially difunctional or polyfunctional isocyanates and carbodiimides. Preferably, the crosslinking agent is added to the primer at a level from 1% to 20% by total weight of primer, most preferably from 1% to 10% by total weight of primer.

The primer typically is coated onto the film to form a primer coat with a dry coat weight from 0.5 to 6 g/m$^2$, preferably from 2 to 3 g/m$^2$. The adhesive layer is applied to the primer coat. Preferably the primer coat is dried prior to application of the adhesive layer. In a preferred embodiment of the invention, the primer coat has been crosslinked by a crosslinking agent present in the primer.

Preferably, the adhesive layer contains less than 25% of a synthetic rubber. Most preferably, the adhesive layer is substantially free of synthetic rubber, e.g., polyisoprene or styrene-butadiene rubber, or other synthetic polymers.

In one embodiment of the invention, the adhesive contains from 1% to 10% of latex particles each of which has a void and a particle size from 50 to 500 nm, as described in U.S. Pat. No. 5,663,213. Such particles act as uv absorbers in the adhesive. Preferably, the adhesive contains from 3% to 6% of said latex particles.

The adhesive tape optionally contains other additives typically used in adhesive tapes, e.g., antioxidants, uv stabilizers, mechanical stabilizers, surfactants, defoamers, pigments, humectants and plasticizers.

The present invention is directed also to an adhesive tape produced by:
(a) applying a primer to a polymer film to form a primer coat; and (b) applying to the primer coat an adhesive comprising: (i) a natural rubber latex; and (ii) a tackifier. Preferably, the natural rubber latex and the tackifier are mixed to form an adhesive, which is then applied to the primer coat. Preferably, the primer coat is dried prior to application of the adhesive.

EXAMPLE

Tape samples were prepared with Centex LATZ natural rubber latex, together with a variety of primers and tackifiers. For the samples prepared with primer, the weight of the dry primer coat was approximately 2.5 g/m$^2$ and the coat weight of the adhesive was approximately 13 g/m$^2$. For the samples prepared without primer, the coat weight of the adhesive was approximately 17 g/m$^2$. All coat weights were determined after drying. Samples are designated 1A–1E, 2A–2E, 3A–3E, 4A–4E, 5A and 5D. Tackifiers used in the samples were as follows: "A" samples contained TACOLYN 1070, a hydrocarbon ($\alpha$-methylstyrene) tackifier available from Hercules Co. (Wilmington, Del.); the "B" samples contained SNOWTACK 780G, a rosin ester tackifier available from Akzo Nobel (Maastricht, Netherlands); the "C" samples contained SNOWTACK 790mG, a rosin ester tackifier available from Akzo Nobel (Maastricht, Netherlands); the "D" samples contained SNOWTACK 880G, a mixed hydrocarbon/rosin ester tackifier available from Akzo Nobel (Maastricht, Netherlands); and the "E" samples contained DERMULSENE TR 501, a terpene phenolic resin tackifier available from ND Dispersions (Dax, France).

The samples were subjected to tests of anchorage and adhesion as follows. Anchorage upon unwind was assessed by unwinding a rolled tape sample and observing the extent of transfer of the adhesive to the back of the tape, from "none" to "complete." The "finger rub" assessment was done by rubbing the adhesive layer manually (initially once, and then repeatedly) and evaluating the degree to which the adhesive was removed on a scale from 0–10. Adhesive face-to-face anchorage was evaluated by contacting the adhesive side of the tape with another section of adhesive side at room temperature, then separating the adhesive sides (initially once, and then repeatedly with added shear force) and evaluating anchorage of the adhesive on a scale from 0–10. For the "finger rub" and face-to-face anchorage evaluations, a score of 0 indicates that the adhesive was readily transferred, scores of 5–7 indicate some anchorage, and a score of 10 indicates little or no transfer of adhesive even under stress. Adhesive peel was measured on stainless steel according to ASTM #D 3330/D 3330M-00 (Method A), but with a dwell time of ten minutes. The results are reported in N/10 mm. The "A" following the numerical result indicates that the failure was adhesive. A description of the samples and the test results are presented in the Table.

TABLE

| | | | anchorage | | | | |
| | | unwind | finger rub | | face-to-face | | |
| sample | primer | (amount of transfer) | once | repeat | once | repeat | peel |
| --- | --- | --- | --- | --- | --- | --- | --- |
| 1A | none | none | 0 | 0 | 0 | 0 | 2.1 A |
| 1B | none | complete | 0 | 0 | 0 | 0 | 2.1 A |
| 1C | none | complete | 0 | 0 | 0 | 0 | 2.3 A |
| 1D | none | complete | 0 | 0 | 0 | 0 | 2.2 A |
| 1E | none | partial | 0 | 0 | 0 | 0 | 2.5 A |
| 2A[1] | rubber/MMA[2] | — | — | — | — | — | — |
| 2B | rubber/MMA[2] | none | 0 | 0 | 0 | 0 | 1.2 A |
| 2C | rubber/MMA[2] | none | 0 | 0 | 0 | 0 | 1.6 A |
| 2D | rubber/MMA[2] | none | 0 | 0 | 0 | 0 | 1.5 A |
| 2E | rubber/MMA[2] | none | 0 | 0 | 0 | 0 | 2.0 A |
| 3A | acrylic[3] | none | 5 | 5 | 5 | 5 | 1.8 A |
| 3B | acrylic[3] | none | 6 | 5 | 6 | 5 | 1.3 A |

TABLE-continued

| sample | primer | unwind (amount of transfer) | finger rub once | finger rub repeat | face-to-face once | face-to-face repeat | peel |
|---|---|---|---|---|---|---|---|
| 3C | acrylic[3] | none | 6 | 5 | 6 | 5 | 1.8 A |
| 3D | acrylic[3] | none | 7 | 5 | 7 | 6 | 1.5 A |
| 3E | acrylic[3] | mostly | 6 | 5 | 7 | 6 | 1.8 A |
| 4A | acrylic/NCO[4] | none | 10 | 9 | 10 | 9 | 1.5 A |
| 4B | acrylic/NCO[4] | none | 10 | 8 | 10 | 9 | 1.5 A |
| 4C | acrylic/NCO[4] | none | 10 | 8 | 10 | 9 | 1.8 A |
| 4D | acrylic/NCO[4] | none | 10 | 8 | 10 | 9 | 1.7 A |
| 4E | acrylic/NCO[4] | almost complete | 9 | 7 | 7 | 5 | 1.5 A |
| 5A | acrylic/nrl/NCO[5] | none | 10 | 10 | 10 | 10 | 1.7 A |
| 5D | acrylic/nrl/NCO[5] | none | 10 | 10 | 10 | 10 | 1.6 A |

[1]The adhesive could not be coated over the primer.
[2]HEVEATUF 1320 latex polymer consisting of 80% natural rubber and 20% MMA graft (available from Heveatex Corp., Fall River, MA).
[3]PRIMAL PR 9599 aqueous acrylic primer (available from Rohm and Haas Company, Philadelphia, PA).
[4]Acrylic primer used in previous samples, with 5% (wet on wet) BASONAT PLR 8878 aliphatic diisocyanate (available from BASF, Ludwigshafen, Germany).
[5]Natural rubber latex/tackifier mixture used in adhesive layer, acrylic primer as above, and 2.5% (wet on wet) diisocyanate as above.

What is claimed is:

1. An adhesive tape comprising:
   (a) a polymer film;
   (b) a primer coat on said polymer film; said primer coat comprising a natural rubber and at least one additional polymer, wherein said additional polymer is crosslinked, and wherein said additional polymer is selected from the group consisting of acrylic polymers, ethylene-vinyl acetate copolymers, ethylene-vinyl acetate-acrylic copolymers, styrene-butadiene copolymers, styrene-butadiene-acrylonitrile copolymers, polyisoprene polymers, polyisobutylene polymers, copolymers thereof, and mixtures thereof, and
   (c) an adhesive layer on said primer coat, said adhesive layer comprising (i) a natural rubber latex; and (ii) a tackifier.

2. The adhesive tape of claim 1 in which the primer coat further comprises a tackifier.

3. The adhesive tape of claim 2 in which the polymer film is selected from the group consisting of polyolefin film, polyester film and PVC film.

4. The adhesive tape of claim 3, further comprising from 1% to 10% of latex particles each of which has a void and a particle size from 50 to 500 nm.

5. An adhesive tape prepared by a method comprising steps of:
   (a) applying a primer comprising: (i) a natural rubber; (ii) at least one additional polymeric component containing functional groups suitable for crosslinking; and (iii) a crosslinking agent; to a polymer film to form a primer coat; and
   (b) applying to the primer coat an adhesive comprising: (i) a natural rubber latex; and (ii) a tackifier.

6. The adhesive tape of claim 5 in which at least one polymeric component of said at least one additional polymeric component in the primer has a $T_g$ no greater than $-10°$ C.

7. The adhesive tape of claim 6 in which the crosslinking agent is a difunctional or polyfunctional isocyanate, a difunctional or polyfunctional amine, or an aziridine.

8. The adhesive tape of claim 7 in which said functional groups suitable for crosslinking are selected from the group consisting of carboxylic acid groups, hydroxyl groups and amino groups.

9. The adhesive tape of claim 8 in which said at least one additional polymeric component is an acrylic polymer.

10. The adhesive tape of claim 9 in which the primer further comprises a tackifier.

11. The adhesive tape of claim 10 in which the crosslinking agent is a difunctional or polyfunctional isocyanate.

12. The adhesive tape of claim 11, further comprising from 1% to 10% of latex particles each of which has a void and a particle size from 50 to 500 nm.

13. The adhesive tape of claim 5 wherein said at least one additional polymeric component is aqueous.

* * * * *